United States Patent
Waymire

(10) Patent No.: US 8,578,845 B2
(45) Date of Patent: Nov. 12, 2013

(54) CHERRY PITTER HAVING SAFETY AND CONVENIENCE

(75) Inventor: Katherine Waymire, Minneapolis, MN (US)

(73) Assignee: Talisman Design, LLC, Minneapolis, MN (US)

( * ) Notice: Subject to any disclaimer, the term of this patent is extended or adjusted under 35 U.S.C. 154(b) by 283 days.

(21) Appl. No.: 13/019,595

(22) Filed: Feb. 2, 2011

(65) Prior Publication Data

US 2011/0189363 A1 Aug. 4, 2011

Related U.S. Application Data

(60) Provisional application No. 61/300,673, filed on Feb. 2, 2010.

(51) Int. Cl.
*A47J 25/00* (2006.01)

(52) U.S. Cl.
USPC .............. 99/559; 99/495; 99/547; 30/113.1

(58) Field of Classification Search
USPC ............................ 99/559, 495, 547; 30/113.1
See application file for complete search history.

(56) References Cited

U.S. PATENT DOCUMENTS

| | | | |
|---|---|---|---|
| 688,065 A | 12/1901 | Crandall | |
| 719,131 A | 1/1903 | Parker | |
| 1,339,367 A * | 5/1920 | Risdon | 99/553 |
| 1,390,804 A * | 9/1921 | Marshall | 99/560 |
| 1,421,333 A * | 6/1922 | Wilcox | 99/559 |
| 1,432,012 A * | 10/1922 | Barndt | 30/113.2 |
| 1,451,254 A * | 4/1923 | Cruzan | 99/560 |
| 1,509,190 A * | 9/1924 | Cook | 30/113.2 |
| 1,785,015 A * | 12/1930 | Thompson | 99/514 |
| 1,926,965 A * | 9/1933 | Bem | 99/562 |
| 2,133,588 A * | 10/1938 | Steinwand | 99/556 |
| 2,209,305 A * | 7/1940 | Ashlock, Jr. | 269/13 |
| 2,271,675 A * | 2/1942 | Ashlock, Jr. | 99/544 |
| 2,402,181 A * | 6/1946 | Polk, Sr. et al. | 426/485 |
| 2,463,854 A * | 3/1949 | Cowan | 99/559 |
| 2,535,928 A * | 12/1950 | Ives | 99/561 |
| 2,552,971 A * | 5/1951 | Hoover | 99/561 |
| 2,629,416 A * | 2/1953 | Luther | 99/562 |
| 3,469,612 A * | 9/1969 | Hesse et al. | 269/13 |
| D317,107 S | 5/1991 | Grass | |
| D330,833 S | 11/1992 | Cheung | |
| 5,329,843 A | 7/1994 | Cheung | |
| 7,549,227 B2 * | 6/2009 | De Blasis et al. | 30/113.2 |
| 7,882,991 B2 * | 2/2011 | Schechter | 222/553 |
| 8,347,783 B2 * | 1/2013 | Kaposi et al. | 99/560 |

FOREIGN PATENT DOCUMENTS

EP 815782 * 1/1998

* cited by examiner

*Primary Examiner* — Anthony Weier
(74) *Attorney, Agent, or Firm* — Patterson Thuente Pedersen, P.A.

(57) ABSTRACT

A safe and convenient cherry pitting device that includes a freestanding detachable base, a fruit support and pitter passthrough unit and a pitter containment cone. The unit is adapted for vertical mounting on the base. Further, the unit defines axially aligned top and bottom openings and one or more side openings. The pitter containment cone generally has a cone shaped outer surface including one or more walls defining a central cavity with a top closed end and a bottom open end for placement over the unit. The cone also includes a pitter bit that projects vertically downward within the top closed end of the cone in axial alignment with the top and bottom openings of the unit.

15 Claims, 11 Drawing Sheets

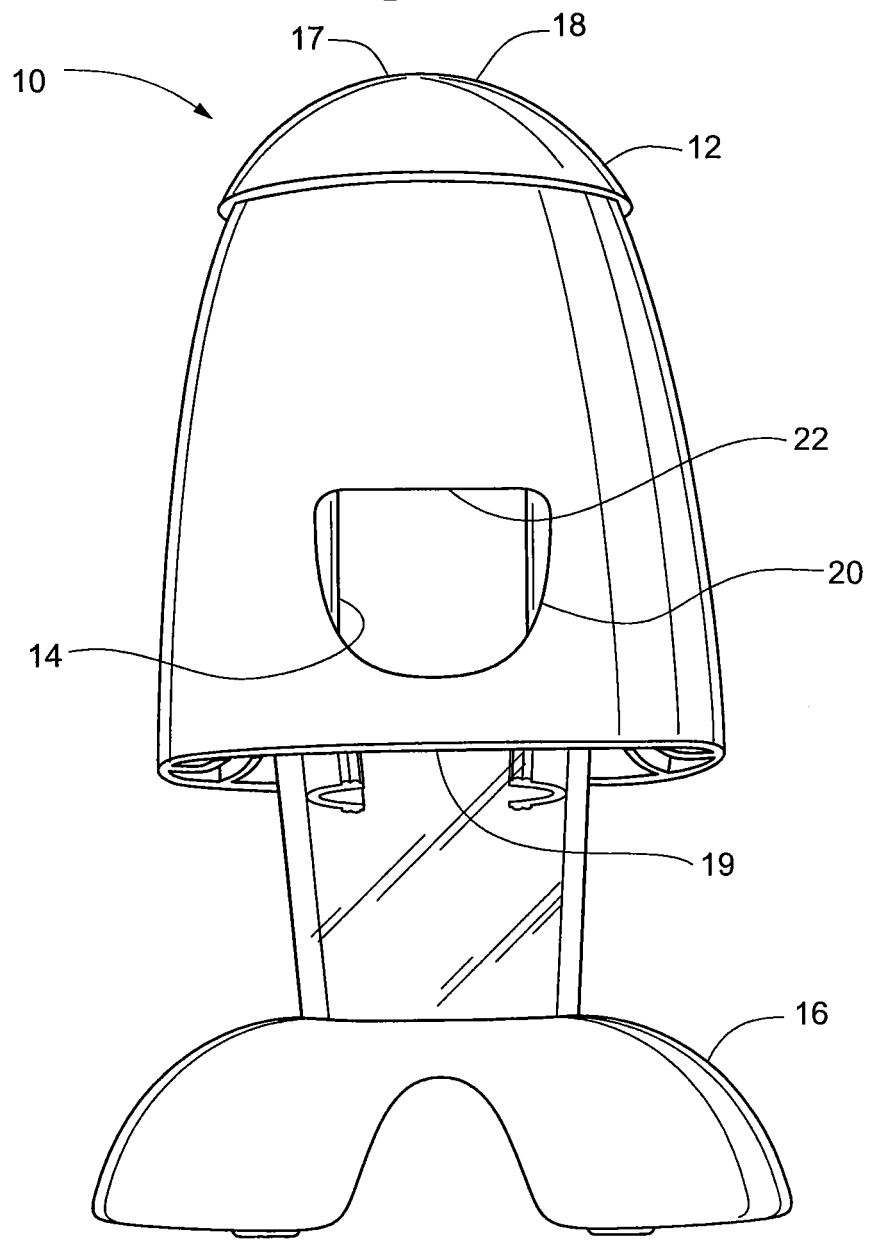

CHERRY PITTER HAVING SAFETY AND CONVENIENCE

RELATED APPLICATION

The present application claims the benefit of U.S. Provisional Application No. 61/300,673 filed Feb. 2, 2010, which is incorporated herein in its entirety by reference.

BACKGROUND OF THE INVENTION

Cherries have long been used in food and drink production due in part to their distinct flavor. Some of the earliest records indicate that cherries have been consumed since prehistoric times as a source of nutrients as cherries are high in carbohydrates. Cherries are often consumed in their unaltered state, but they have also been an ingredient in almost all forms of food for human consumption, although desserts are the most popular. Cherries are often used in pies, tarts, doughnuts, cakes, cobblers, cookies and even in carbonated and alcoholic beverages, more recently, it has been discovered that cherries also contain anthocyanins which may act as a natural anti-inflammatory. These anthocyanins are also a good source of antioxidants, which can help the human body reduce free radicals and arguably lend to a longer, healthier life. Due to their taste, nutritional and therapeutic value, cherries are still grown and consumed in many parts of the world. Recent estimates suggest that over 2 million tons of cherries are grown and cultivated worldwide.

While the cherry is consumed in great numbers, as shown above, the structure of the fruit itself provides a challenge to the consumer. Evolutionarily, the cherry tree proliferates by utilizing a method similar to other fruit trees, a seed surrounded by an attractant. The cherry tree produces the cherry seed surrounded by the sugary, sweet-tasting fruit in order to attract animals. The animals would, in turn, take the cherry, eat the fruit and drop the seed. In many instances the seed would reach the soil, which would allow for the proliferation of the cherry plants. While this method has worked for thousands of years, it also makes the use of cherries in recipes and for raw consumption difficult due to the cherry seed or pit, which is at the center of the cherry. As a result, several cherry pitters have been manufactured that are able to remove the pit from the center of the cherry, allowing for the cherry's use and consumption.

Several cherry pitters are and have been in the market and the concept of the cherry pitter is not, itself, new. However, while the cherry pitter has been in the market for years, they all fail to provide an enjoyable cherry pitting experience. The cherry pitters on the market today mainly utilize one of two designs: the thumb plunger and the pivot axis designs. The basic thumb plunger cherry pitter can be seen in U.S. Pat. No. 719,131 to E. D. Parker. This design utilizes a cherry holding member which has integrated finger holes and a molded cherry holder with pit passage and a plunger which has an integrated thumb hole or thumb pad and a pitting tip. In operation, a person wanting to pit the cherry would place a cherry on the molded cherry holder and then place their fingers in the finger holes and use their thumb to depress the plunger, thus driving the pitting tip through the cherry and pushing the pit through the pit passage. While this design in somewhat simplistic, it also leaves a great deal to be desired. In using this design, there is no protection for the errant finger to be placed in the path of the depressing pitting tip. This may put the operator's or other's fingers at risk of injury. Further, this design allows for cherry juices that are expelled by the depressing plunger to flow anywhere in the surrounding area, potentially allowing the juices to flow onto any surrounding clothing or furniture. Further, the thumb plunger design often is not easy to use as it requires the operator to place the cherry correctly in the molded cherry holder and continually depress the plunger. Further, these types of pitters are not ergonomic as they require the operator to continually use their fingers to hold, and depress the plunger, which can contort the hands into unnatural positions and cause fatigue in the hand muscles, reducing the number of cherry pittable during a pitting session. Some designs utilize a spring to return the plunger to an open position; however, while the spring acts as a return, it also provides additional resistance to the travel of the plunger thus making it even harder to depress the plunger. Finally, these designs act to push the cherry pit through the pit passage into open space, in other words, there is no receptacle for the cherry pit and thus, during the pitting, cherry pits may be strewn about the area in which the operator is pitting.

The other main cherry pitter design utilizes a pivot axis to assist in removing of cherry pits. These designs utilize two main pivoting arms that are connected at one end, providing a pivot axis. On one of the arms, is a molded cherry receptacle and a pit passage. On the other arm a cherry pitting plunger is affixed. The pitting plunger may have a pitting tip. In operation, an operator would place the cherry into the molded cherry receptacle and close the two arms, causing them to pivot towards each other and driving the plunger downwards toward the cherry. The plunger would push through the cherry forcing the pit through the pit passage on the opposite arm. In addition, many of these designs have a spring mechanism near the pivot access which preferences the pivoting arms into an open position. Further, various embodiments of this design have a mechanism that will lock the pivoting arms into a closed position for storage. This locking mechanism is often a blocking piece of material that fits inside the back portion of the pivot axis, forcing the pivoting arms into a closed position. However, this blocking piece may easily dislodge and allow the pivot arms to move into the open position, thus causing problems if the cherry pitter is stored in a drawer with other utensils. The basic pivot axis cherry pitter can be seen in U.S. Pat. No. 688,065 to J. A. Crandall. This design also suffers from many of the problems the above-referenced plunger design. The pivot axis design provides no finger protection and arguably allows more finger access, making the device potentially dangerous in use. Further, the cherry juices may be expelled with greater velocity given the force allowed by the pivot axis. Further, while this type of plunger may be slightly easier to use, it still requires the operator to place the cherry correctly in the molded cherry holder and continually depress the plunger. These types of putters don't require the use of the fingers to depress the plunger; however they still require a gripping motion to pivot the two pivot arms. Thus the operator may still become fatigued quickly. Further, these designs still push the cherry pit through the pit passage into open space, thus the cherry pit that is removed from the cherry it not retained or controlled.

Recently, other designs have come onto market that attempt to ease the process of cherry pitting. These designs utilize a gravity feed hopper, which attempts to automatically "guide" the cherry into a pitting station. The pitting station may then have a plunger which the operator can depress. The plunger may have a pitting tip which pushes the pit into a receptacle below. However, these types of cherry pitters are potentially dangerous to operate as the hopper may not center the cherry correctly and thus, when plunging, there is the possibility of partial pitting of diffraction which may propel the cherry and/or pit in a random direction. In addition, these types of pitters still fail to protect operator fingers and fail to prevent cherry juice from being propelled in various directions. Finally, these designs require awkward body positions in order to depress the plunger, potentially leading to use injury or other body stresses.

Given the various disadvantages outlined above, a need exists for a cherry pitter that is easy to use, safe, ergonomic and able to manage cherry juices and waste effectively.

SUMMARY OF THE INVENTION

The invention includes a cherry pitter that reduces the mess involved in the pitting process. The pitter includes a compression action that is safe and easy for children and the elderly to use. The pitter is dishwasher safe, and can be fabricated from a wide variety of materials including plastics, metals, and other polymers.

In some embodiments, the invention includes a cherry pitter having safety and convenience. The cherry pitter includes a freestanding detachable base, a fruit support and pitter passthrough unit adapted for vertical mounting on the base, and a pitter containment core. The fruit support and pitter passthrough unit defining axially aligned top and bottom openings and one or more side openings. The pitter containment cone generally has a cone shaped outer surface including one or more walls that define a central cavity with a top closed end and a bottom open end for placement over the unit. The pitter containment cone further includes a pitter bit that projects vertically downward within the top closed end of the cone in axial alignment with the top and bottom openings of the unit.

Other embodiments of the invention include methods for pitting cherries including first providing a cherry pitter having safety and convenience that includes a freestanding detachable base, a fruit support and pitter passthrough unit vertically mounted on the base, a pitter containment cone, and a return member. The fruit support and pitter passthrough unit defining axially aligned top and bottom openings and at least one side opening. The pitter containment cone generally having an inverted cone shape including one or more walls defining a central cavity with a closed end and a bottom open end for placement over the unit. The cone further including a pitter bit that projects vertically downward within the top closed end of the cone in axial alignment with the top and bottom openings of the unit. Finally the return member is located between the unit and the closed end of the cone which biases the unit and cone from each other. Next, the method includes placing the base of the cherry pitter on a flat surface of a counter or table, for example, and placing a cherry into the unit. The method also requires bracing the base to the surface and placing one hand on the cone. Finally, the method includes applying a vertically downward force to push the cone towards the flat surface, thereby moving the pitter bit through the unit, puncturing the cherry, and expelling the pit and refuse into a compartment in the base.

In another embodiment of the invention, the device includes a cherry pitting device including a base member having a freestanding disposition and which contains a receptacle for receiving cherry pits, a central unit defining a central cavity for supporting cherry fruit for pitting, and a vertically displaceable top containment member. Further, the unit has axially aligned apertures in the top and bottom of the unit and one or more side openings providing access for inserting or removing cherry fruit, the central unit includes features for stacked vertical mounting on the base member. The vertically displaceable top containment member generally has an inverted cone shape including walls that generally define a central cavity with a downwardly directed opening for placement over the central unit. The top containment member further includes a vertically oriented pitter bit within the closed end of the cone that is sized for insertion in the axially aligned apertures.

BRIEF DESCRIPTION OF THE DRAWINGS

FIGS. 1A, 1B, 1C and 1D are perspective views of the cherry pitter having safety and convenience rotated about a vertical axis according to an embodiment of the invention;

DETAILED DESCRIPTION OF THE DRAWINGS

Figure 1A:
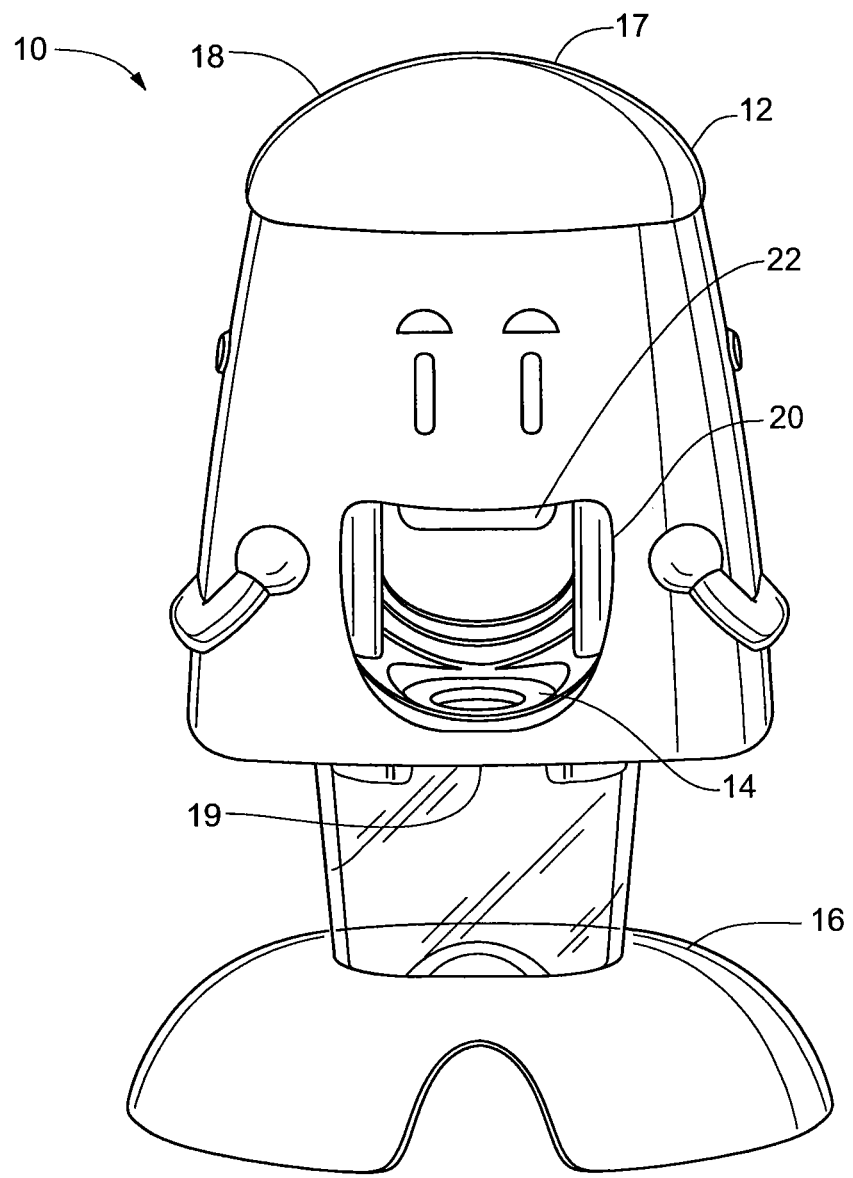
Figure 1B:
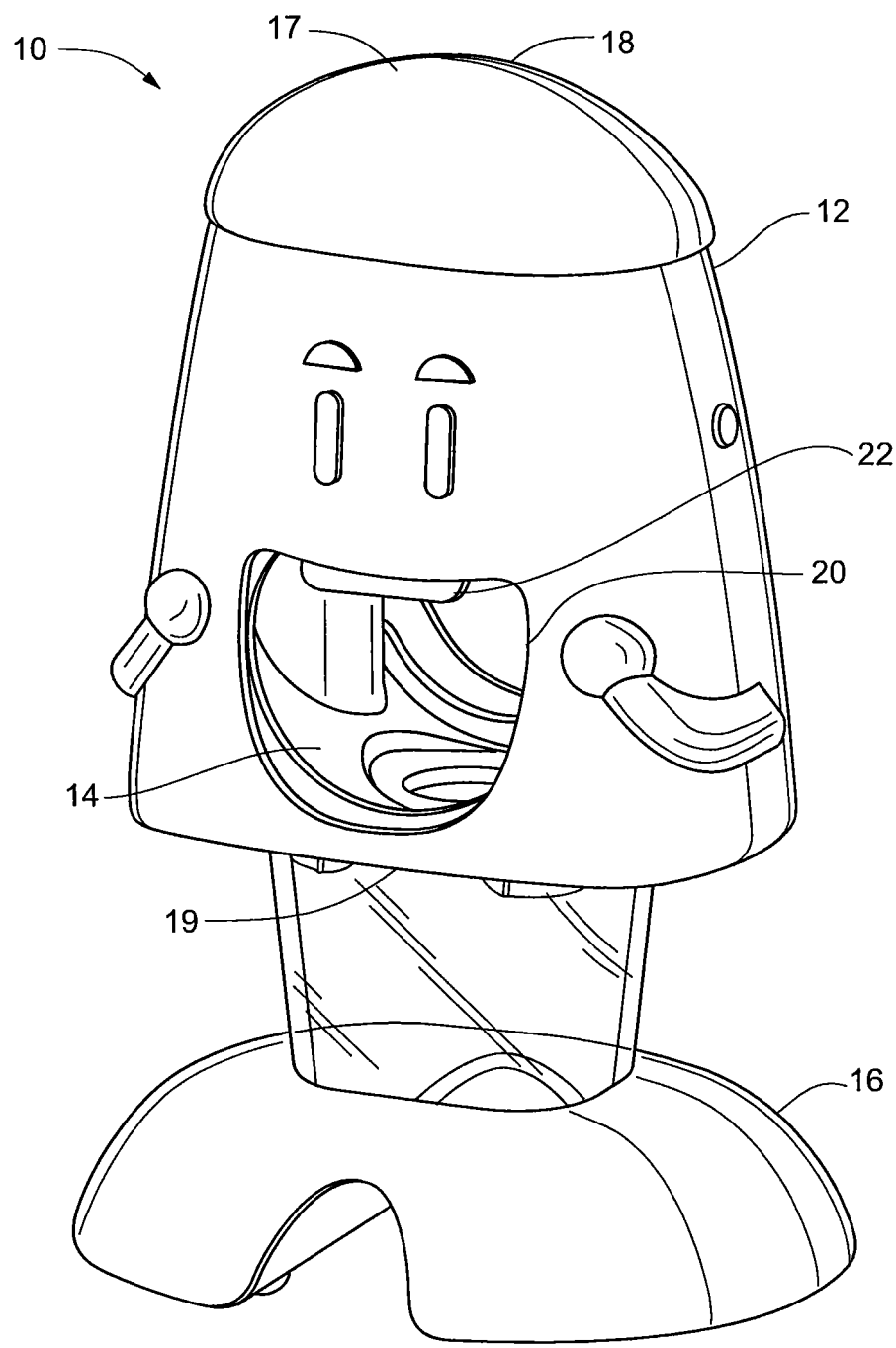
Figure 1C:
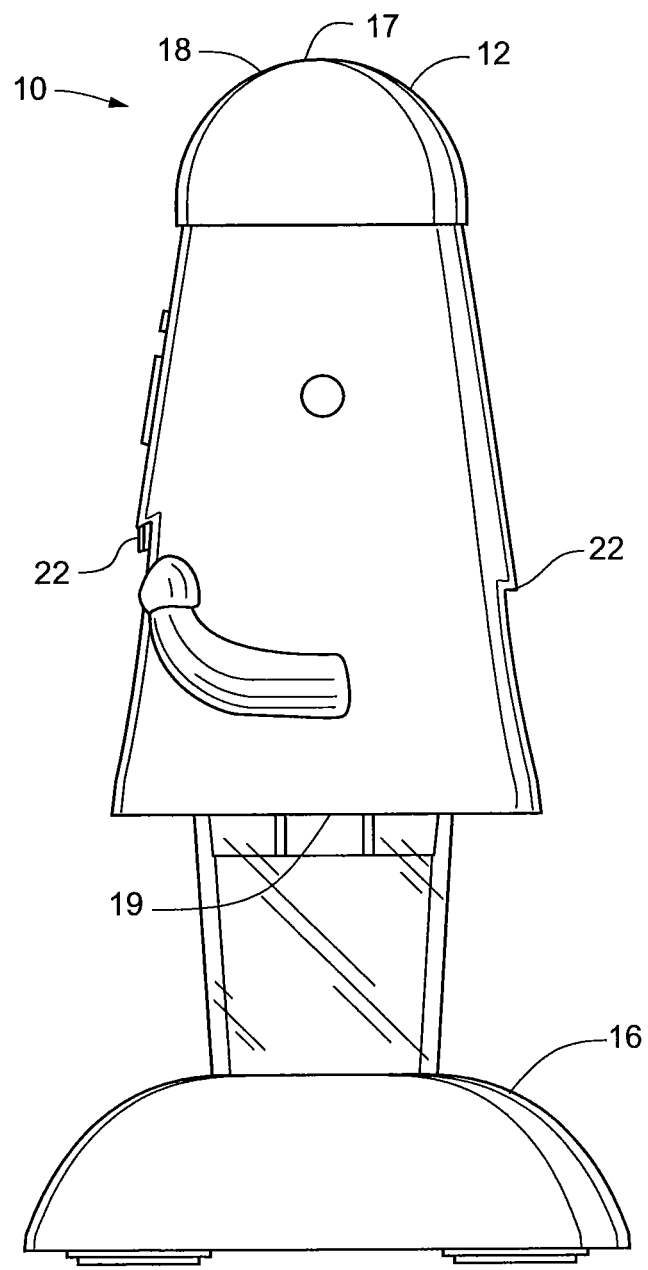

The embodiments of the invention will be detailed in the following description in accordance with the drawings.

Referring to FIGS. 1A through 1D, a cherry pitter having safety and convenience (CPSC) 10 is depicted according to one embodiment of the invention. The CPSC 10 comprises a pitter containment cone (PCC) 12, a fruit support and pitter pass-through unit (FSPP) 14 and a detachable base unit (DBU) 16. In various embodiments, the CPSC may be formed of a metal such as aluminum, stainless steel and magnesium or a plastic such as polyethylene, polystyrene, polyvinyl chloride and polytetrafluoroethylene. In still other embodiments the CPSC is formed of an Acrylic resin such as Polymethyl methacrylate. In various embodiments the trade dress of the CPSC, PCC, FSPP and DBU may be altered to cater to different market segments without affecting the function of the CPSC.

In various embodiments, the PCC 12 comprises a rest 18, a fruit pass-through 20, a safety element 22, an FSPP guide channel 24 (not shown), a pitter bit 26 (not shown), one or more FSPP mounts 28 (not shown) and a FSPP return mechanism 30 (not shown). The rest 18 may be formed in an ergonomic form, such as a form to fit comfortably into the palm of a hand, thus allowing the continual and lengthy operating sessions without injury or fatigue. In other embodiments, the rest 18 may be flat, or curved inversely, or formed to enable receipt of strikes from a hard or rubberized driver such as a mallet, thereby allowing the CPSC to be used by the elderly, handicapped or by automated machinery. In other embodiments, the PCC 12 may be formed in order to direct any fruit juices or refuse downward toward the detachable base unit 16. In this way, the PCC 12 is able to prevent juices or refuse from being propelled uncontrollably into space, thus ensuring a clean, mess-free operation of the CPSC 10. As seen in FIGS. 1A-1D and the subsequent figures, the PCC 12 generally has a cone shaped outer surface made up of one or more walls defining a central cavity 15 with a closed top end 17 and a bottom open end 19. The PCC 12 is shaped for placement over the FSPP 14 and operative coupling to the FSPP 14.

The fruit pass-through 20, of the PCC 12, provides at least one side opening and may be substantially circular, substantially rectangular or formed in another shape that allows for the pass-through of fruit. In various embodiments, the fruit pass-through may be covered by a perforated fruit pass-through barrier, thereby allowing fruit to pass, and also providing a measure of containment, thereby ensuring that fruit is retained in the FSPP 14. Further, in various embodiments, the fruit pass-through 20 is integrated into two sides of the PCC 12, thereby allowing side openings for access to the FSPP 14 from at least two sides. In other embodiments, the PCC 12 only utilizes one fruit pass-through 20 in order to maximize the fluid and refuse directing capabilities of the CPSC 10.

The safety element 22 may be integrated into the fruit pass-through 20 or be an independent element. The safety element 22 acts to protect hands, fingers, or other objects from the pitter bit 26 (not shown) and thus assists in ensuring a safe and reliable operation. In various embodiments, the FSPP guide channel 24 (not shown) provides an actuating channel for the FSPP 14. FSPP mounts 28 (not shown) of the PCC 12 ensure that the FSPP 14 is releasably affixed to the PCC 12 and enables actuation of the PCC 12 in relation to the FSPP 14.

Figure 2:
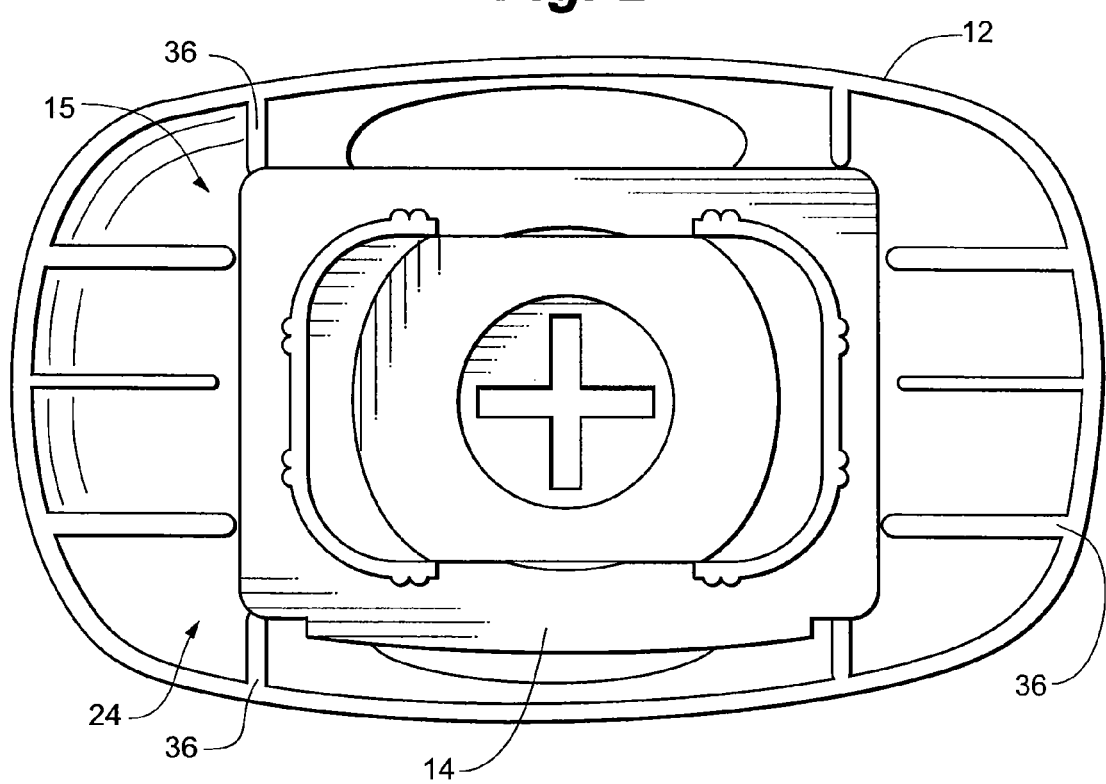
FIG. 2 is a perspective view of the pitter containment cone and fruit support and pitter pass-through unit according to an embodiment of the invention.

Now referring to FIG. 2, a PCC 12 according to one embodiment is depicted. In various embodiments the PCC 12 includes several structural reinforcement splines 36 within the central cavity 15 in order to ensure that the PCC 12 maintains its structure over time. Further, the structural reinforcement splines 36 provide support to the FSPP 14 in the FSPP guide channel 24. The structural reinforcement splines 36 may be formed of a metallic material such as aluminum or steel, or they may be formed of a plastic such as polyethylene, polystyrene, polyvinyl chloride, abs, as, polycarbonate and polytetrafluoroethylene. In still other embodiments the structural reinforcement splines 36 are formed of an Acrylic resin such as Polymethyl methacrylate. In operation, the structural reinforcement splines 36 provide support for the FSPP 14, thereby allowing it to actuate in a substantially controlled motion within the FSPP guide channel 24.

Figure 3:
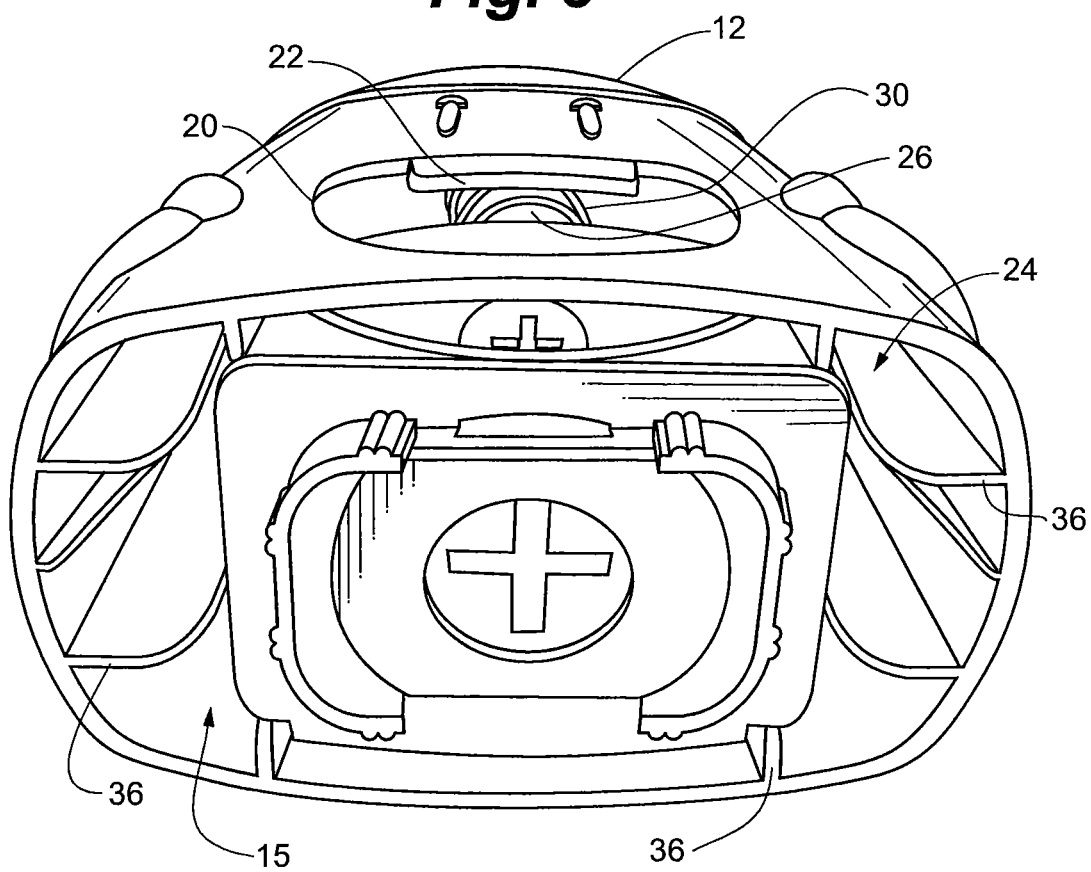
FIG. 3 is a further perspective view of the pitter containment cone and fruit support and pitter pass-through unit according to an embodiment of the invention.

Now referring to FIG. 3 a PCC 12 according to another embodiment is depicted. In various embodiments the FSPP return mechanism 30 is releasably affixed to the PCC 12. In various embodiments the FSPP return mechanism is a single spring, a plurality or springs, a lever or another mechanism capable of providing resistance to linear compression and maintaining a significantly extended position. The FSPP return mechanism 30 may be formed of a metallic material such as aluminum or steel, or they may be formed of a plastic such as polyethylene, polystyrene, polyvinyl chloride and polytetrafluoroethylene. In other embodiments, a pitter bit 26 is releasably affixed to the interior of the PCC 12. In various embodiments, the pitter bit 26 is oriented inside the FSPP return mechanism 30, thereby ensuring that the FSPP 14 will actuate away from the pitter bit 26 when the FSPP return mechanism 30 returns to an extended position. The pitter bit 26 may extend within the closed end of the cone in a vertically downward disposition. The pitter bit 26 may be formed of a metallic material such as aluminum or steel, or they may be formed of a plastic such as polyethylene, polystyrene, polyvinyl chloride and polytetrafluoroethylene or any other material that is non-toxic, resists bacterial buildup and is resistant to shattering and wear. The pitter bit 26 may have a formed bit head that enables the pitter bit to "surround" or "grab" the fruit pit, thereby allowing the pitter bit 26 to assist in removing the pit from fruit. Further, in various embodiments the pitter bit 26 may be sharpened on the fruit contact portion, thereby allowing for easier perforation of the fruit.

Therefore, in general, the return mechanism 30 is located between the FSPP 14 and the closed top end 17 of the PCC 12 to bias the FSPP 14 and PCC 12 from each other, and arranged such that the bias may be overcome by depressing the PCC 12 vertically downward and moving the pitter bit 26 vertically through the FSPP 14 while shielding the one or more side openings of the FSPP 14 with the cone shaped outer walls of the PCC 12.

Figure 4A:
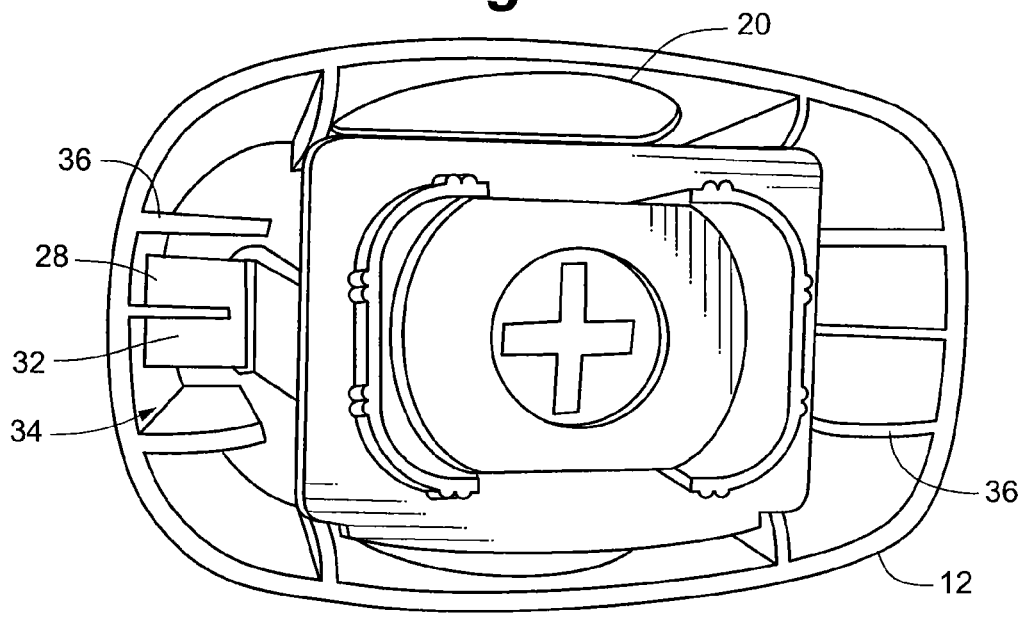
FIGS. 4A-4B are perspective views of the pitter containment cone guide channel and fruit support and pitter pass-through unit according to an embodiment of the invention.
Figure 4B:
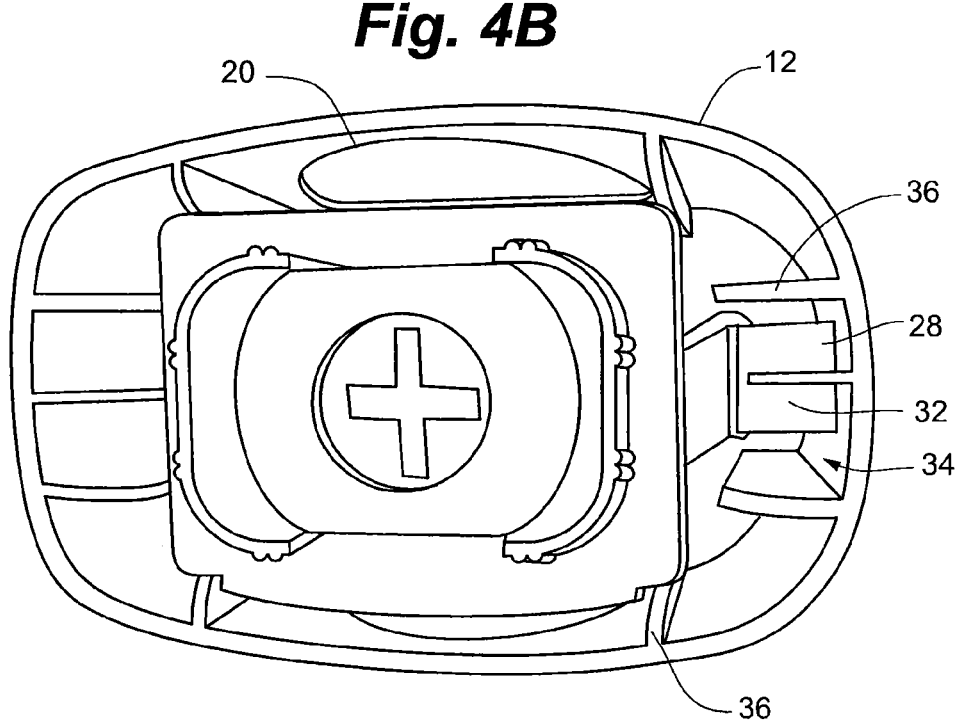

Now referring to FIGS. 4A and 4B a PCC 12 according to another embodiment is depicted. The FSPP mounts 28 of the PCC 12 may comprise FSPP mount tabs 32 and FSPP mount guide channels 34. The FSPP mount tabs 32 prevent the FSPP 14 from separating from the PCC 12 during operation. In various embodiments, the FSPP mount tabs 32 act as a stop to the FSPP mount guide channels 34. The FSPP mount guide channels 34 allow the FSPP 14 to actuate within the PCC 12 and provide direction for actuation, thereby ensuring that the FSPP 14 actuates reliably. Further, the FSPP mount tabs 32 may provide a balance and a resistance to the actuation of the FSPP 14 thereby ensuring a smooth and reliable use of the CPSC 10.

Figure 5A:
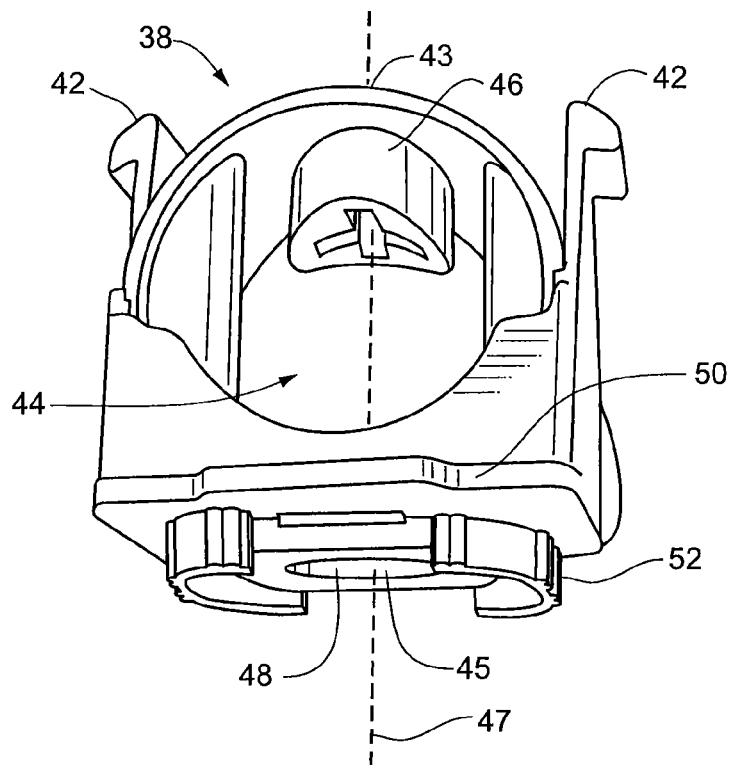
FIGS. 5A-5B are perspective views of fruit support and pitter pass-through units according to various embodiments of the invention.
Figure 5B:
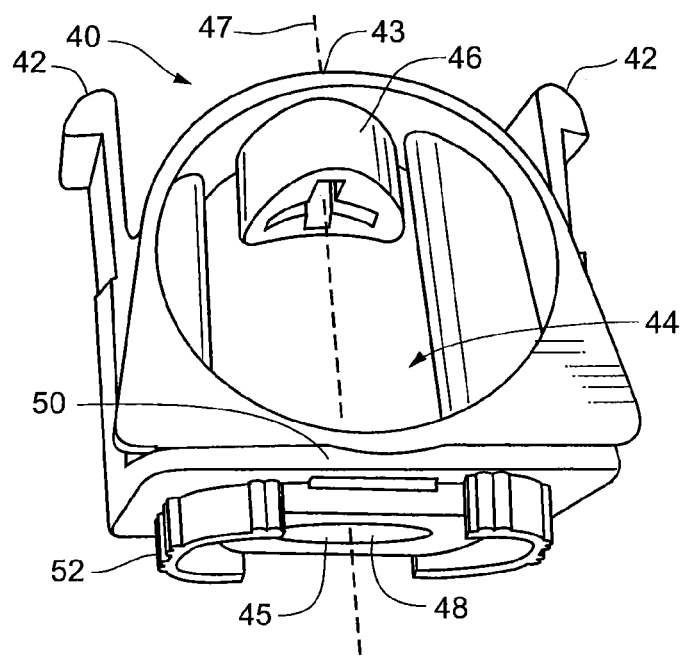

Now referring to FIGS. 5A and 5B, a first embodiment 38 and a second embodiment 40 of the FSPP 14 is depicted. The FSPP 14 has PCC interface tabs 42, fruit support channel 44, pitter bit alignment channel 46, fruit pit expulsion channel 48, PCC channel guides 50, and detachable base unit interface elements 52. The PCC interface tabs 42 may protrude from the body of the FSPP 12 and interface with the FSPP mount guide channels 34 of the PCC 12. The PCC interface tabs 42 actuate within the FSPP mount guide channels 34 allowing the FSPP 14 to actuate independently of the PCC 12. The PCC interface tabs also interface with the FSPP mount tabs 32 which prevent the FSPP 14 from becoming detached from the PCC 12.

The fruit support channel 44 provides one or more side openings that may be substantially circular and is capable of receiving fruit of various sizes and configurations. In certain embodiments, the fruit support channel 44 has molded channel ridges that retain fruit within the channel. These molded channel ridges may allow the CPSC 10 to be tipped or held at an angle without fruit placed within the fruit support channel 44 being expelled. The pitter bit alignment channel 46 defines a top opening 43 and an adjacent channel that passes into the FSPP 14 which allows the pitter bit to pass through into the fruit support channel 44 and into contact with fruit retained therein. The pitter bit alignment channel 46 also acts as a pitter bit support, thus ensuring that the pitter bit is aligned correctly in relation to the fruit support channel 44. In addition, the pitter bit alignment channel 46 is capable of cleaning the pitter bit when the PCC moves to the substantially extended position as provided by the FSPP return mechanism 30. Thus, the pitter bit alignment channel 46 is capable of ensuring that the pitter bit 26 remains clean and aligned correctly, thereby reducing the wear and tear of the pitter bit 26 and reducing the chance of bacterial buildup on the pitter bit 26.

The fruit pit expulsion channel 48 enables the pitter bit 26 to pass thereby allowing the fruit pit to be expelled from the fruit that may be placed in the fruit support channel 44. Centrally located in the bottom of the FSPP 14 is a bottom opening 45. The top opening, the bottom opening 45, and the passage in the pitter bit alignment channel 26 are disposed in generally in axial alignment. For example see axis 47 in FIGS. 5A and 5B. In various embodiments, the fruit expulsion channel 48 may have a fruit expulsion channel insert 54 formed of a more flexible material, such as an elastic hydrocarbon polymer in order to allow the fruit pit to pass and to receive the pitter bit 26. In this way, the fruit expulsion channel insert 54 may assist in the guidance and cleaning of the pitter bit 26.

The FSPP 14 may have PCC channel guides 50 that assist in centering the FSPP 14 inside the PCC 12. Further, the PCC channel guides may interface with the FSPP guide channels 24 in order to further align the FSPP 14 inside the PCC 12 and enable smooth operation. The FSPP 12 may be may be formed of a metallic material such as aluminum or steel, or they may be formed of a plastic such as polyethylene, polystyrene, polyvinyl chloride and polytetrafluoroethylene or other material that is resistant to bacteria and wear.

Figure 6:
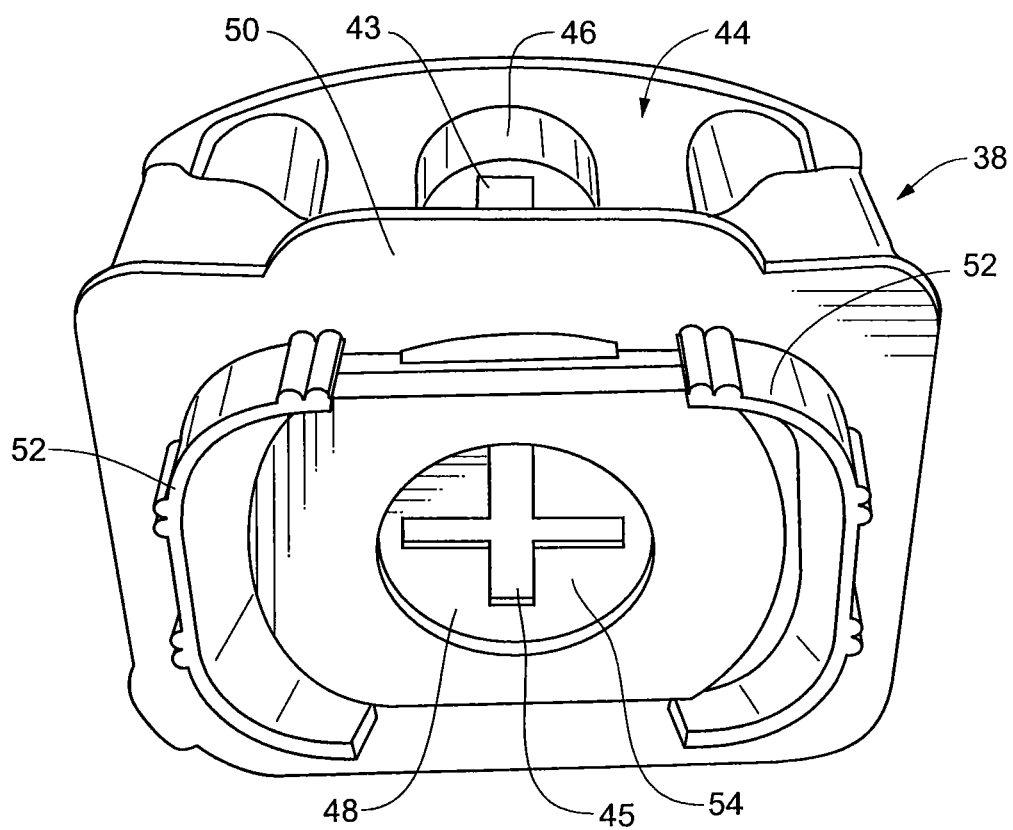
FIG. 6 is a perspective view of a fruit support and pitter pass-through unit according to an embodiment of the invention.

The FSPP 14 also has one or more detachable base unit interface elements 52. The detachable interface elements 52 may be significantly semicircular and may utilize a plurality of interface splines that interface with a detachable base unit 16 in a releasable configuration. Other embodiments may utilize detachable base unit interface elements 52 that are completely circular or formed in other shapes thus allowing the interface to a variety of different detachable base units 16. Further, in some embodiments, the detachable base unit interface elements 52 are in contact with an inner portion of the detachable base unit 16. In other embodiments, the detachable base unit interface elements 52 are in contact with outer portion of the detachable base unit 12 or the inner and outer portions of the detachable base unit 12. In various embodiments the detachable base unit interface elements 52 interface with the detachable base unit 16 using friction. In other embodiments, the detachable base unit interface elements 52 may interface with the detachable base unit 16 using a mechanical mechanism to maintain an affixed relationship such as a slide squeeze clip, quick release screw, thumb screw or similar. Another embodiment of the FSPP 14 is depicted in FIG. 6, in which the detachable base unit interface elements 52, fruit pit expulsion channel 48, PCC channel guide 50, fruit support channel 44 and pitter bit alignment channel 46 are depicted.

Figure 7A:
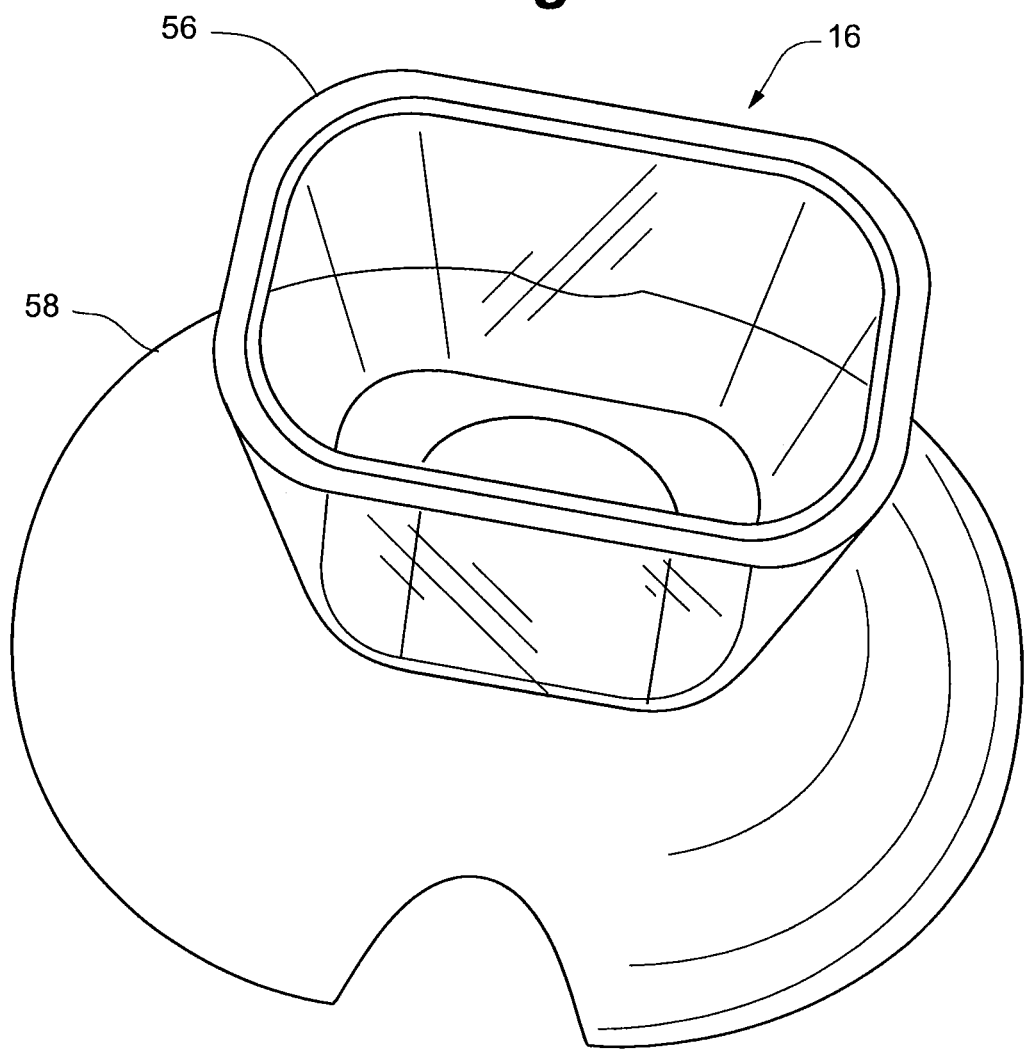
FIG. 7A is a perspective view of the detachable base unit according to an embodiment of the invention.
Figure 7B:
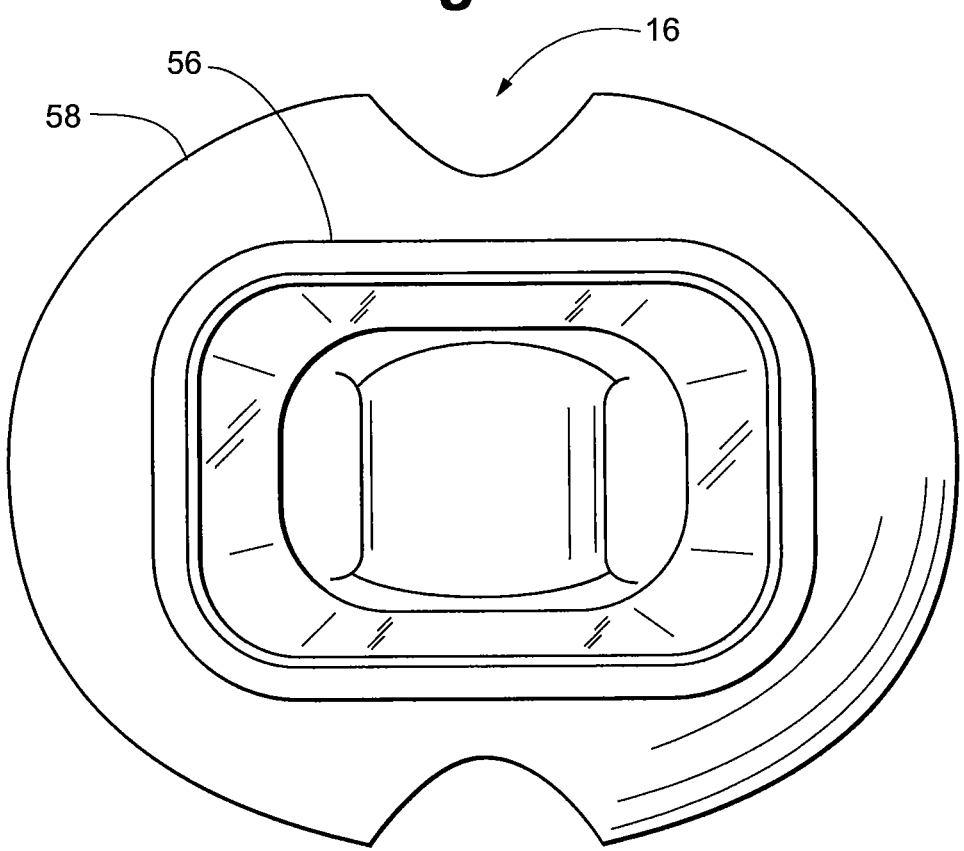
FIG. 7B is a top view of the detachable base unit according to an embodiment of the invention.

Now referring to FIGS. 7A and 7B a detachable base unit 16 is depicted according to one embodiment. The detachable base unit 16 may be may be formed of a metallic material such as aluminum or steel, or they may be formed of a plastic such as polyethylene, polystyrene, polyvinyl chloride and polytetrafluoroethylene or other material that is resistant to bacteria and wear. The detachable base unit may have a pit and refuse receiving portion 56 and a base portion 58. As seen in the Figures, the pit and refuse receiving portion 56 interfaces with the detachable base unit interface elements 52 of the FSPP 14 such that the FSPP is vertically stacked on the detachable base unit 16. Further, the pit and refuse receiving portion 56 may be affixed to the base portion 58 using non-mechanical force, adhesive, or a screw, clip or other mechanical device. The pit and refuse receiving portion 56 may be formed in a variety of shapes, sizes and colors, thereby allowing for increased or reduced storage of pits and refuse. Further, the pit and refuse receiving portion may include one or more apertures to enable the interface of additional utensils or to enable more efficient cleaning and maintenance.

The base portion 58 may be formed of a different material than the pit and refuse receiving portion 56 in order to enable additional stability or rigidity. Further, the base portion 58 may be significantly flat on one side, to enable the base portion to be placed on a flat surface and allow the CPSC 10 to stand freely. The base portion 58 may also have one or more channels or apertures to reduce the amount of material required in producing the base portion 58, thereby reducing the weight and increasing the portability of the CPSC 10. Additionally, the base portion 58 may take on a variety of shapes and sizes in order to allow for more flexible application of the CPSC 10 where different levels of stability, weight and size are required. For instance, if CPSC 10 was going to be utilized in a high throughput environment, a larger detachable base unit 16 with larger pit and refuse receiving portion 56 and larger and broader base unit 58 would be required and implemented to ensure function and stability of the CPSC 10. In various embodiments, the base portion 58 may include mounting arms or mounting channels that enable the base portion to interface with various mounting devices such as swing-arms, table mounts, or wall mounts, thus allowing the CPSC 10 to be utilized in nearly any position or location. Further the base portion 58 may include one or more anti-slip feet made of an anti-slip material such as an elastic hydrocarbon polymer such as rubber. In various embodiments, the anti-slip feet are affixed with long-lasting adhesive.

Based on the disclosure above, one can understand how the CPSC 10 may be utilized. A user may place the CPSC 10 on a generally flat surface such as a counter or table, ensuring that the base portion 58 of the detachable base unit 16 is resting securely on the counter or table surface. The user would then ensure that the PCC 12 is securely attached to the detachable base unit 16 before proceeding. The user would then select a fruit, such as a cherry and place it in the FSPP 14 by first passing through the opening referred to as the fruit pass-through 20 of the PCC 12. The fruit rests in the FSPP 14 until the user is ready to actuate the PCC 12. The user may then take one hand and brace the detachable base unit 16 to the surface. The user may take the other hand and place it on the ergonomic form of the PCC 12.

The user would then compress the PCC 12 and the FSPP return mechanism by applying a downward force, pushing the PCC 12 towards the table or counter surface. As the PCC 12 moves towards the table or counter, the pitter bit 26 will move through the pitter bit alignment channel 46, into the fruit support channel 44 and contact the fruit. The pitter bit will then puncture the fruit and contact the fruit pit. The pitter bit will continue its motion through the fruit pushing the pit through the fruit expulsion channel 48 and the fruit expulsion channel insert 54 if present. At this point, the FSPP return mechanism 30 may not allow any further travel. In some embodiments, there may be tabs or blocks that prevent any further movement of the PCC 12. Once through, the pit will be expelled into the pit and refuse receiving portion 56 of the detachable base unit 16. The user may then release the downward pressure being applied by, for example, removing their hand from the PCC 12. The FSPP return mechanism 30 may then return the PCC 12 to its original position. As the PCC 12 returns to its original position, the pitting bit may be cleaned, at least in-part, by the fruit expulsion channel insert 54 and pitter bit alignment channel 46 thus ensuring repeated operation. It should be noted that while the PCC 12 moves downward, the PCC 12 will cover the FSPP 14 thereby preventing access, providing the security mentioned earlier. It should also be noted that the fruit pass-through 20 of the PCC 12 may allow the user to visualize when the fruit pit is pushed into the pit and refuse receiving portion 56 of the detachable base unit. A person having skill in the art will recognize that this is just one example embodiment of a method of using the CPSC 10.

The above description is not intended to describe each illustrated embodiment or every implementation of the present invention. While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

What is claimed is:

1. A cherry pitter having safety and convenience, comprising:
    a freestanding detachable base;
    a fruit support and pitter passthrough unit adapted for vertical mounting on the base, the unit defining axially aligned top and bottom openings and one or more side openings;
    a pitter containment cone generally having a cone shaped outer surface including one or more walls defining a central cavity with a top closed end and a bottom open end for placement over the unit, the cone further including a pitter bit that projects vertically downward within the top closed end of the cone in axial alignment with the top and bottom openings of the unit, further including a return member located between the unit and the closed end of the cone to bias the unit and cone from each other, wherein the bias of the return member may be overcome by depressing the cone vertically downward to move the pitter bit vertically through the unit while shielding the one or more side openings of the unit with the one or more cone walls.

2. The cherry pitter of claim 1, wherein the return member includes one or more springs.

3. The cherry pitter of claim 1, wherein the base contains a portion for receiving and retaining cherry pits and refuse.

4. A cherry pitter having safety and convenience, comprising:
    a freestanding detachable base;
    a fruit support and pitter passthrough unit adapted for vertical mounting on the base, the unit defining axially aligned top and bottom openings and one or more side openings;
    a pitter containment cone generally having a cone shaped outer surface including one or more walls defining a central cavity with a top closed end and a bottom open end for placement over the unit, the cone further including a pitter bit that projects vertically downward within the top closed end of the cone in axial alignment with the top and bottom openings of the unit, wherein the one or more walls of the cone define a side opening for insertion or removal of fruit.

5. The cherry pitter of claim 4, wherein the side opening of the cone includes a safety element adjacent the side opening of the cone for protecting hands, fingers or other objects from the pitter bit.

6. The cherry pitter of claim 4, wherein a perforated fruit pass through barrier covers the side opening of the cone.

7. The cherry pitter of claim 1, wherein the cone is shaped to direct fruit juices downward toward the base.

8. The cherry pitter of claim 1, wherein the cherry pitter is made of metal.

9. The cherry pitter of claim 1, wherein the cherry pitter is made of plastic.

10. The cherry pitter of claim 1, wherein the cherry pitter is made of acrylic resin.

11. The cherry pitter of claim 1, wherein the bottom opening of the unit has a insert formed of flexible material to allow the fruit pit to pass and to receive the pitter bit.

12. A cherry pitting device, comprising:
    a base member having a freestanding disposition and which contains a receptacle for receiving cherry pits;
    a central unit defining a central cavity for supporting cherry fruit for pitting, the unit having axially aligned apertures in the top and bottom of the unit and one or more side openings providing access for inserting or removing cherry fruit, the central unit including features for stacked vertical mounting on the base member;
    a vertically displaceable top containment member generally having an inverted cone shape including walls that generally define a central cavity with a downwardly directed opening for placement over the central unit, the top containment member further including a vertically oriented pitter bit within the closed end of the cone that is sized for insertion in the axially aligned apertures, further including a return member located between the unit and the top containment member to bias the unit and top containment member from each other, and arranged such that the bias may be overcome by depressing the top containment member vertically downward and moving the pitter bit vertically through the unit while shielding the one or more side openings of the unit with the containment member walls.

13. The cherry pitter of claim 12, wherein the return member includes one or more springs.

14. The cherry pitter of claim 12, wherein the walls of the top containment member define a side opening for insertion or removal of fruit.

15. The cherry pitter of claim 14, wherein the walls of the top containment member include a safety element adjacent the side opening for protecting hands, fingers or other objects from the pitter bit.

* * * * *